United States Patent
Jain

(12) 
(10) Patent No.: US 11,658,707 B2
(45) Date of Patent: May 23, 2023

(54) INTELLIGENT SELECTION OF PHYSICAL LAYER TRANSMISSION TYPES IN 802.11AX BASED WI-FI NETWORKS

(71) Applicant: Fortinet, Inc., Sunnyvale, CA (US)

(72) Inventor: Ankur Jain, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/490,937

(22) Filed: Sep. 30, 2021

(65) Prior Publication Data

US 2023/0097531 A1 Mar. 30, 2023

(51) Int. Cl.
| | |
|---|---|
| H04L 23/02 | (2006.01) |
| H04B 7/0452 | (2017.01) |
| H04L 5/00 | (2006.01) |
| H04B 17/327 | (2015.01) |
| H04W 28/18 | (2009.01) |
| H04B 7/0456 | (2017.01) |

(52) U.S. Cl.
CPC ......... *H04B 7/0452* (2013.01); *H04B 7/0456* (2013.01); *H04B 17/327* (2015.01); *H04L 5/0007* (2013.01); *H04W 28/18* (2013.01)

(58) Field of Classification Search
CPC .. H04B 7/0626; H04B 7/0452; H04B 7/0617; H04B 7/0695; H04L 1/1812; H04L 61/10; H04L 69/08; H04L 69/324; H04W 28/26; H04W 72/1284; H04W 80/00; H04W 72/082; H04W 52/285; H04W 84/12; H04W 48/20; H04W 72/085
USPC ........................................ 375/262, 260, 267
See application file for complete search history.

(56) References Cited

U.S. PATENT DOCUMENTS

| | | | | |
|---|---|---|---|---|
| 6,571,084 | B1 * | 5/2003 | Jabbary | H04W 28/18 455/69 |
| 2021/0022073 | A1 * | 1/2021 | Kwok | H04W 72/085 |
| 2022/0061055 | A1 * | 2/2022 | Freda | H04W 72/1263 |
| 2022/0217779 | A1 * | 7/2022 | Taherzadeh Boroujeni | H04W 74/02 |

* cited by examiner

*Primary Examiner* — Khai Tran
(74) *Attorney, Agent, or Firm* — Law Office Of Dorian Cartwright; Dorian Cartwright

(57) ABSTRACT

A transmission type is determined for a specific station on a Wi-Fi network. A transmission type of OFDMA is selected responsive to the mobility value for the specific station meeting a mobility threshold. A transmission type of MU-MIMO is selected responsive to the similarity value for the specific station meeting a similarity threshold. A transmission type of SU-MIMO is selected responsive to the specific station not meeting the similarity threshold. The network interface transmits data packets to stations using OFDMA, SU-MIMO or MU-MIMO as selected.

15 Claims, 6 Drawing Sheets

INTELLIGENT SELECTION OF PHYSICAL LAYER TRANSMISSION TYPES IN 802.11AX BASED WI-FI NETWORKS

FIELD OF THE INVENTION

The invention relates generally to computer networking, and more specifically, to intelligent selection of transmission type for IEEE 802.11ax Wi-Fi compliant networks based on station characteristics.

BACKGROUND

As wireless networks evolve and grow, there are multiple technologies emerged on physical layer for data transmission such as OFDMA, MU-MIMO and SU-MIMO. SU and MU MIMO was emerged prior to 11ax networks while OFDMA was first time introduced in Wi-Fi 11ax based networks. An 802.11ax based wireless Transmitter can use either of physical layer scheduling methods for data transmission.

These methods could be segregated based on sounding (beamformed) and non-sounding (No-beamformed) requirements. SU and MU-MIMO requires the channel sounding and hence falls into beamformed transmissions while OFDMA do not requires the channel sounding so falls into Non-beamformed scheduling transmission.

Beamforming channel sounding measurements are very complex with high airtime utilization and will bring down overall performance if not done accurately. One beamforming feedback for a single receiver could cost 1 to 2% of airtime. And this value can become insane as count of receivers increased. Receivers that keep on changing locations need more beamforming measurements so that they can prevent stale data. On the other hand, receivers which do not change locations frequently, will waste network airtime, memory and computing resources with unnecessary sounding measurements. Therefore, at the places where client is very much mobile where very frequent channel sounding is required, beamformed (SU & MU-MIMO) transmissions cannot reap the benefits and compensate throughput gain with loss of airtime utilization due to sounding frame exchange.

Similarly, using MU grouping at the places where clients are not much spatially together or may not having similar capabilities or content type or device type could not generate much beamforming gains due to complex final beamforming matrix of non-similar client types which ends up with more processing power and memory. Also wider beamformed transmission due to spatially scattered users will in fact nullify the sole benefit of narrow, aligned and point to point beamforming gain.

Therefore, what is needed is a robust technique for intelligent selection of transmission type for IEEE 802.11ax Wi-Fi compliant networks based on station characteristics.

SUMMARY

These shortcomings are addressed by the present disclosure of methods, computer program products, and systems for intelligent selection of transmission type for IEEE 802.11ax Wi-Fi compliant networks based on station characteristics.

In one embodiment, a transmission type is determined for a specific station on a Wi-Fi network. A mobility unit determines a mobility value of stations of the group of stations. A transmission type of OFDMA is selected responsive to the mobility value for the specific station meeting a mobility threshold.

In another embodiment, a similarity detection unit to determine a similarity value between the specific station and the group of stations below the mobility threshold. A transmission type of MU-MIMO is selected responsive to the similarity value for the specific station meeting a similarity threshold. A transmission type of SU-MIMO is selected responsive to the specific station not meeting the similarity threshold. The network interface transmits data packets to stations using OFDMA, SU-MIMO or MU-MIMO as selected.

Advantageously, computer network performance is improved.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for providing proxy encryption services for intelligent selection of transmission type for IEEE 802.11ax Wi-Fi compliant networks based on station characteristics.

One of ordinary skill in the art will recognize many additional variations made possible by the succinct description of techniques below.

I. Systems for Intelligent Transmission Type Selection (FIGS. 1-2)

Figure 1:
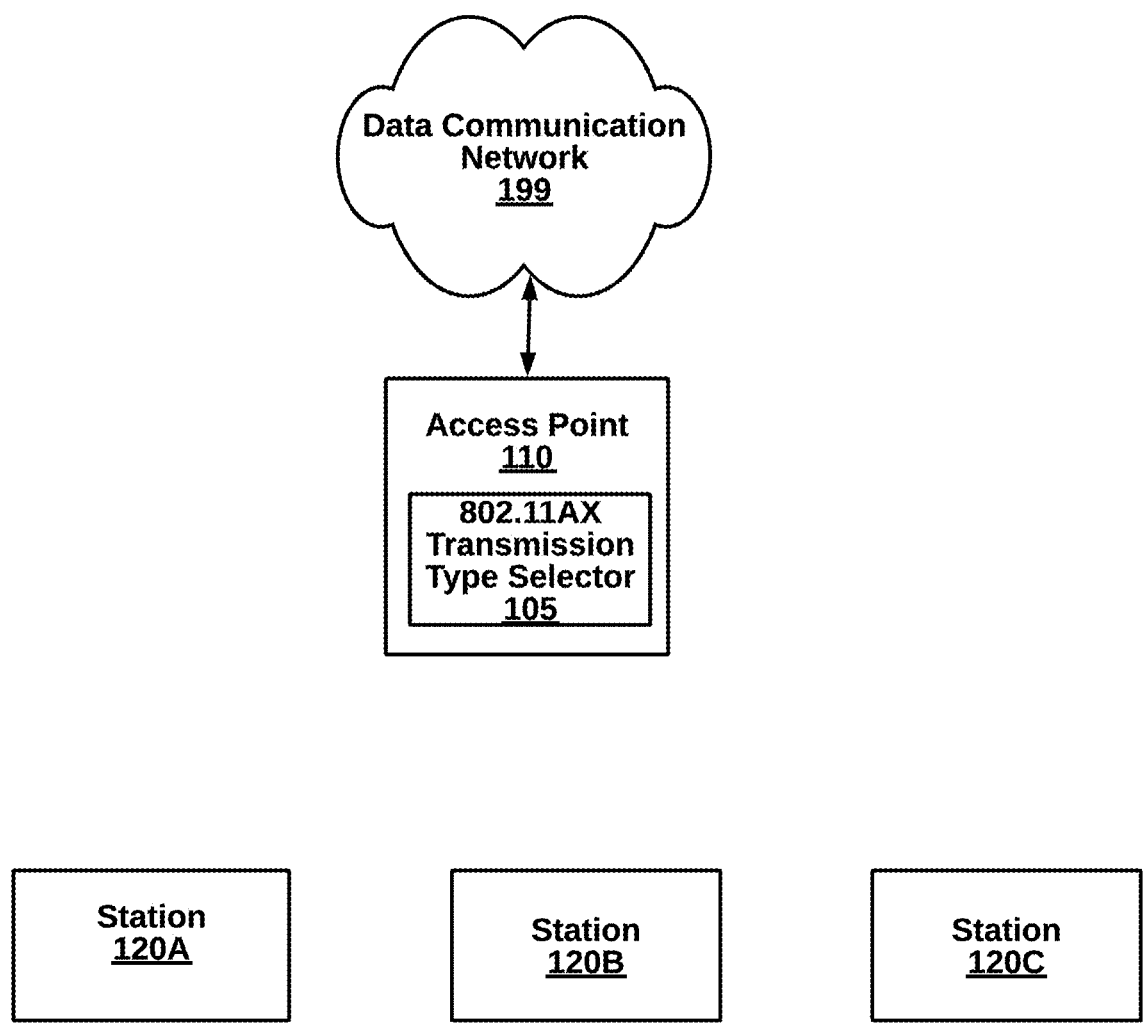
FIG. 1 is a high-level block diagram illustrating a system for intelligent selection of transmission type for IEEE 802.11ax Wi-Fi compliant networks based on station characteristics, according to one preferred embodiment.
Figure 2:
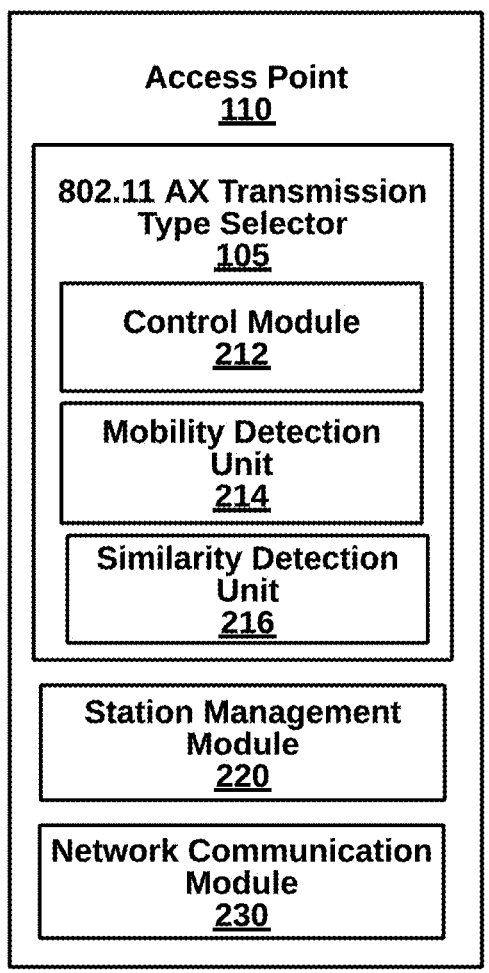
FIG. 2 is a more detailed block diagram illustrating an access point providing proxy encryption services for intelligent selection of transmission type for IEEE 802.11ax Wi-Fi compliant networks based on station characteristics, according to an embodiment.

FIG. 1 is a high-level illustration of a system 100 for intelligent selection of transmission type for IEEE 802.11ax Wi-Fi compliant networks based on station characteristics, according to an embodiment. An access point 110 is coupled to a plurality of stations 120A-C over a Wi-Fi portion of a data communication network 199.

The components of the system 100 are coupled in communication over the data communication network 199. Preferably, the access point 110 connected to the data communication system via hard wire. Other components, such as the headless IoT devices can be connected indirectly via wireless connection. The data communication network 199 can be any data communication network such as a WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11AX.

In one embodiment, the access point 110 is 802.11ax enabled and the stations have OFDMA, MU-MIMO and SU capabilities. Stations are associated to access point over a Wi-Fi portion of the communication network. The access point 110 has the downlink data to transmit to one or multiple stations. Stations, for which AP has the data to transmit and RSSI is changed significantly from previous value, become eligible for computing Mobility and Similarity score. If RSSI of station do not change much from previous calculation, new scores (mobility & Similarity) are not computed and station remains part of old transmission method.

A mobility score is calculated once the station eligible for same. Mobility score is determined based on some parameters of client mobility within network. Mobility score includes clients RSSI, client current position, movement from current position, how fast is client movement within the network and client roaming between APs. Based on client RSSI received from AP, how RSSI fluctuates and frequent AP assignments during roaming within WLC, can help to calculate mobility score. AP triangulate can further help to client positioning. Based on mobility score, a type of physical transmission method between beamforming (SU &MU-MIMO) and OFDMA is selected for the station. If client(s) are very much mobile, its mobility score is increased. When mobility score is high and more than a threshold (MStsh), transmitter will select OFDMA transmission since when receivers which constantly change locations need more beamforming measurements to prevent stale data. Then even after using frequent channel sounding, that feedback data may become stale quickly so may not help give updated beamformed matrix and therefore not so good beam formed transmission and this little gain in performance will be severely compromised with high airtime utilization (could cost 1 to 2% of airtime) due to frequent channel sounding. So overall beamforming gain would be very less for such receivers. Also, significant memory and processing would be consumed for calculating beamforming matrix which in-turn without much gain. Therefore, using OFDMA transmission for high mobility clients could be more beneficial since there are no sounding measures requires for OFDMA. However Extra sounding frames in SU & MU cause airtime Utilization for each added receiver which affects specially the feedback of high mobility clients.

As a result, stations with high mobility score are selected for OFDMA transmission method and traffic for these stations would be grouped together and sent out using OFDMA transmission method. If mobility score is less and less than threshold (MStsh), means receivers are not much mobile or either stationary, can choose beamforming transmission since when clients are either stationary or slow moving, channel sounding will be less frequent required and gain in performance will be high as compared to low airtime utilization. For such type of receivers, beamforming feedback would not be stale and final calculated beamforming matrix will have more accurate data so that final beam formed stream will be less spread and concentrate energy directly at the target correspond to high beamforming gain.

Therefore, Mobility score can help to segregate client between sounding (SU & MU-MIMO) and Non-sounding (OFDMA) based mechanism.

However, sounding mechanism (Beamforming transmissions) further includes MU-MIMO and SU-MIMO. Mobility score cannot help to further decide between these two sounding mechanisms (SU and MU) since both beamforming methods, requires channel sounding and Mobility score helping only choosing between sounding and non-sounding methods.

A different criterion is needed for the station to further decide between SU and MU beamforming transmission. Stations are chosen from group of low mobility score and a similarity score is calculated for each station. Similarity score is determined based on clients RSSI, client spatial positioning with each other, client positioning wrt. Transmitter, content type, device type, device capability & spatial stream support. When the similarity score is high and more than threshold (SStsh), all these stations would be selected for MU transmission and traffic for these stations would be grouped together and sent out using MU transmission technique. Having high similar score, means high similarity among clients. When such receivers have high similarity, they will have identical beamforming feedback and thus final beamforming matrix created from AP side will have much better aligned and less spread beam formed transmission targeted for receivers thus giving better performance and high beamforming gain.

When receivers are spatially closed together with similar capabilities then calculated beamforming matrix from AP side will be less complex and will consume less processing power as well. Similarity score will be less when clients are scattered or not having similar device type or capabilities will not fit for MU group transmission. Final beamforming matrix calculated for such stations would be complex and will consume more processing power and memory. Also, MU beam formed data for such receivers will also be wider if these are spatially scattered, for wider transmission MU beamforming gain would be very less therefore such receivers will be selected for SU transmission. When the similarity score is low, all these stations would be selected for SU transmission method and traffic for these stations would be sent out individually using SU transmission method. Each such receiver will have separate transmission unlike MU-MIMO where multiple receivers are transmitted simultaneously.

An example:

Assume 20 stations are connected to the access point 110 (which is a 20 MHz, 4 spatial streams AP). At some moment, the access point 110 has downlink data to transmit for 9 stations and RSSI of all 9 stations are assumed to be changed by more than 3 dB. Thus, these 9 stations become eligible for selecting as "group of receivers" for which mobility and similarity score are calculated.

Figure 3A:
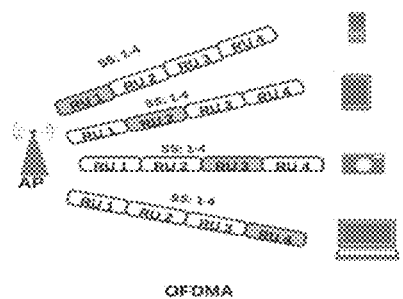
FIGS. 3A-3C are schematic diagrams illustrating transmission types, according to an embodiment.

Mobility score is calculated for each station and based on the threshold, assume 4 stations are qualified for OFDMA method, traffic for these stations are grouped together and traffic to these stations are sent out using OFDMA method, as shown in FIG. 3A. The remaining 5 stations have low mobility score, thus these 5 stations are further send out for calculating similarity score to further find out SU or MU transmission method. Since 4 stations qualify for OFDMA, traffic for these 4 stations will be grouped together and traffic will be sent using OFDMA method OFDMA also allows a multi user transmission. it would divide the channel into 4 RU tones to serve four selected users simultaneously at the same time. OFDMA is a MU (Multi User) transmission technique since it can transmit to multiple users (stations) at a time by sub-dividing the channel. Unlike MU-MIMO, where spatial streams are divided between stations for simultaneous run to multiple stations. If only a single station were selected for OFDMA transmission, then entire bandwidth (256 subcarriers) would have been allocated to that station.

A channel bandwidth is made of subcarriers and so a fraction of subcarriers is allocated to each station. In the FIG. 3A, the access point 110 supports up to four spatial streams (SS) in element 310 with 20 MHz, communicating with four stations at a time (simultaneously). Every station is allocated 4 spatial streams however different number of RU tones: 20 MHz channel (256 subcarriers) divided into 4 RU groups (52 subcarriers per RU group); STA-1: all 4 SS allocated utilizing only RU-1 (52 Subcarriers); STA-2: all 4 SS allocated utilizing only RU-2 (52 Subcarriers); STA-3: all 4 SS allocated utilizing only RU-3 (52 Subcarriers); and STA-4: all 4 SS allocated utilizing only RU-4 (52 Subcarriers).

The remaining 5 stations are not qualified for high mobility score, they are further sent out in similarity score module. Similarity score is calculated for each station. If similarity score is more than threshold, traffic for these stations is sent for MU-MIMO grouping. If score is less, stations are sent for SU-MIMO. Assume, 4 stations have score more than similarity threshold, these stations are sent for MU-MIMO grouping and remaining 1 station is sent for SU-MIMO.

Figure 3B:
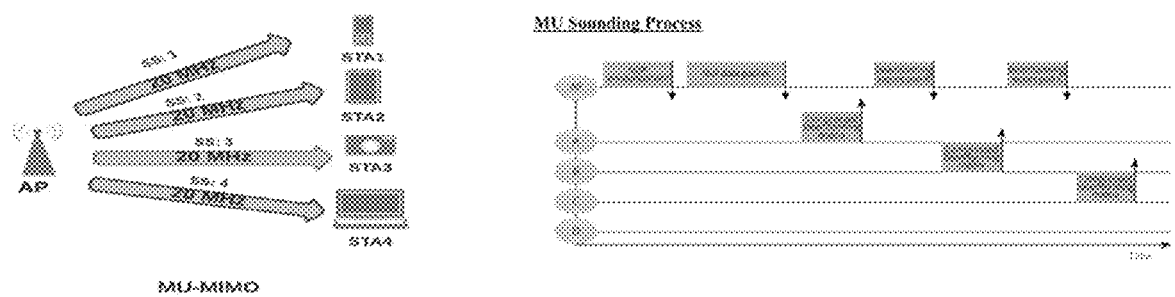

As shown in element 320 of FIG. 3B, selected 4 stations are sent for MU-MIMO grouping, traffic for these stations are grouped together and traffic for the selected group of 4 stations will be sent using MU-beamforming method. MU-MIMO allows a multi user transmission by dividing the spatial streams between users, however it cannot subdivide the channel frequency unlike OFDMA. Here multi user transmission is achieved by using different spatial streams (SS) with full bandwidth for each Spatial stream. In FIG. 3B, the access point 110 supports up to four spatial streams (SS), and would communicates to four stations simultaneously at a time via 1 spatial stream dedicated to each station: STA1: SS1 (Spatial Stream 1) is allocated utilizing full bandwidth (20 Mhz); STA2: SS2 (Spatial Stream 2) is allocated utilizing full bandwidth (20 Mhz); STA3: SS3 (Spatial Stream 3) is allocated utilizing full bandwidth (20 Mhz); and STA4: SS4 (Spatial Stream 4) is allocated utilizing full bandwidth (20 Mhz).

As shown in element 330 of FIG. 2, before sending the traffic using MU transmission to the grouped stations, channel sounding process is performed by the access point 110, which composed of a VHT null data packet (NDP) announcement frames, VHT NDP frames, VHT compressed beamforming frames and beamforming report poll frames. Where NDP (Null Data Packet) announcement, NDP (Null data packet) are sent from the access point 110 and compressed beamforming feedback is responded by station. For every next station, the access point 110 sends beamforming report poll frame, for that every next station would respond by compressed beamforming matrix frame. Therefore, as the count of stations are increased, no of sounding frames are increased which consumes a lot of airtime and thus can reduce the effective performance. After receiving the compressed beamforming matrix frame from each station, the access point 110 would send the MU transmission to these 4 stations.

The remaining station is sent for SU beamforming group. Even if two stations would have sent for SU group, they would have not grouped together since SU transmission is single user transmission. Here it would not be simultaneous transmission unlike MU-MIMO and OFDMA. SU-MIMO is a single user transmission where all the spatial streams of transmitter can communicate with one station at a time. The access point 110 supports up to four spatial streams (SS), here the access point 110 will communicate with one station at a time by utilizing all the four spatial streams dedicated to that station only. The access point 110 will use full bandwidth (20 MHz) with the station.

Figure 3C:
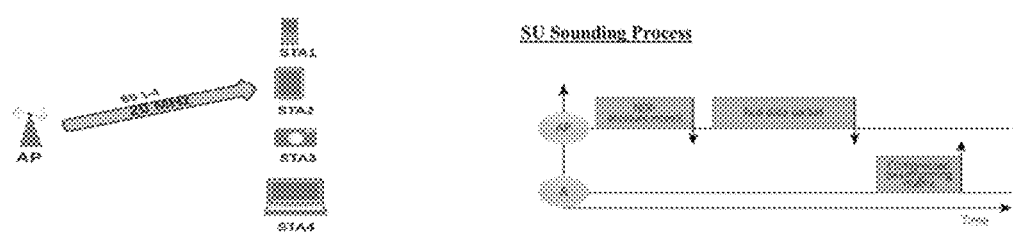

In element 340 of FIG. 3C, the access point 110 supports up to four spatial streams (SS), and the access point 110 can communicate with maximum one station at a time via all four spatial streams dedicated to the station.

As shown in element 350 of FIG. 3C, before starting the SU transmission, the access point 110 performs channel sounding process, where NDP (Null Data Packet) announcement frame and NDP (Null data packet) frame are sent from the access point 110. The entire channel sounding process is carried out in one burst. Following receipt of the NDP, the station responds with a compressed beamforming feedback frame. The feedback matrix frame tells the access point 110 (beam former) how the training symbols in the NDP were received, and therefore how the AP should steer the data frames to the station for a large gain. After performing channel sounding, SU data transmission will be followed up.

The access point 110 can be a sever blade in an array of server blades, a PC (personal computer), a mobile computing device, a laptop device, a smartphone, a tablet device, a phablet device, a video game console, a stationary computing device, an Internet appliance, a virtual computing device, a distributed computing device, a cloud-based computing device, or any appropriate processor-driven device.

FIG. 2 is a more detailed illustration of the access point 110 of the system 100 of FIG. 1. An 802.11ax transmission type selector 105 includes a control module 212, a mobility detection unit 214 and a similarity detection unit 216. A station manager 220 manages connections of wireless stations to the data communication network 199. A network communication module 230 includes hardware and software for implementing Wi-Fi protocols such as OSI software, Wi-Fi transceivers, and specifically OFDMA, SU-MIMO and MU-MIMO transceivers for communicating over the air to wireless stations. The modules can be implemented in source code stored in non-transitory memory executed by a processor. Alternatively, the modules can be implemented in hardware with microcode. The modules can be singular or representative of functionality spread over multiple components. Many other variations are possible.

The control module 212, of the transmission type selection module 214, can determine a transmission type for a specific station on a Wi-Fi network. The determination can be based on mobility and similarity of the specific station. The control module 212 also interfaces with transceivers to implement selections.

In more detail, the mobility detection unit 214 determines a mobility value of stations of the group of stations. The control module determines a transmission type of OFDMA responsive to the mobility value for the specific station meeting a mobility threshold.

The similarity detection unit 216 determines a similarity value between the specific station and the group of stations below the mobility threshold.

Output values from the mobility detection unit 202 and the similarity detection unit 216 can be collected by the control module 212 and evaluated against thresholds. The control module 212 can then determine a transmission type of MU-MIMO responsive to the similarity value for the specific station meeting a similarity threshold.

The network interface transmits data packets to stations using OFDMA, SU-MIMO or MU-MIMO as selected by the control module 212. One or more transceivers use radio frequency to modulate signals according to the IEEE 802.11ax protocol, for example. As a result, highly mobile stations are serviced with OFDMA transceivers, and of the remaining that get MIMO, similar stations are serviced using MU-MIMO transceivers, a highest service level. Dissimilar stations are serviced using SU-MIMO transceivers.

II. Methods for Intelligent Transmission Type Selection (FIGS. 4-5)

Figure 4:
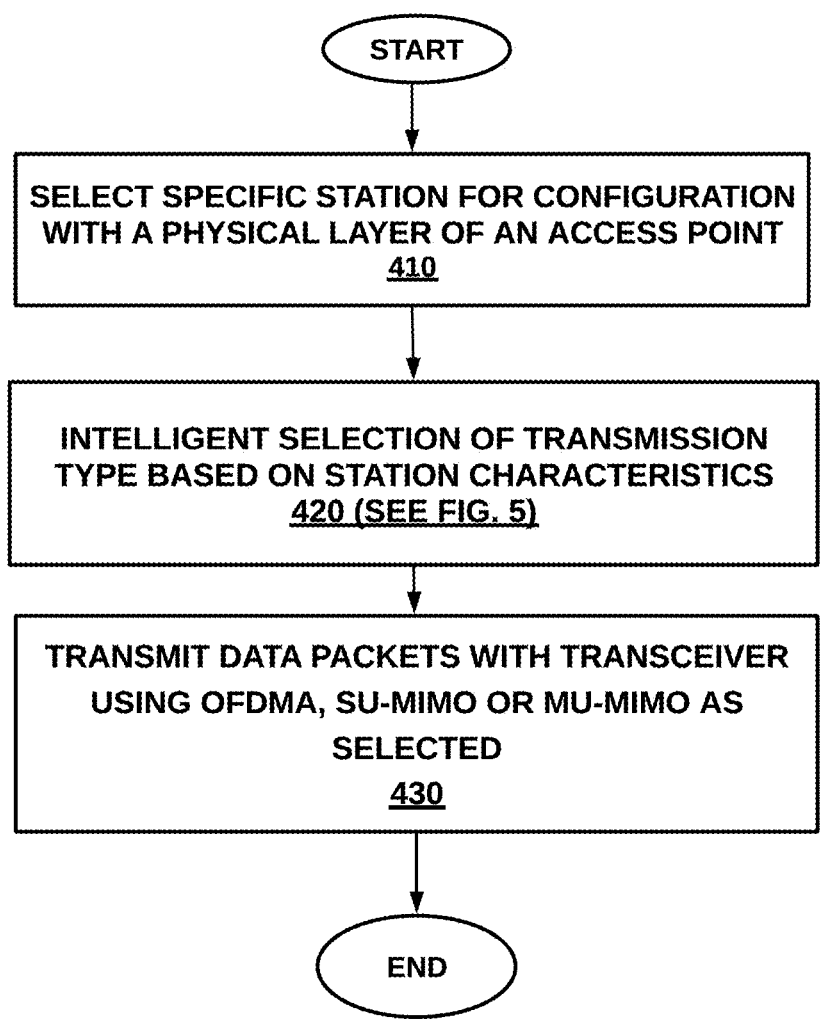
FIG. 4 is a high level flow diagram illustrating a method for transmitting to a specific station, according to some embodiments.
Figure 5:
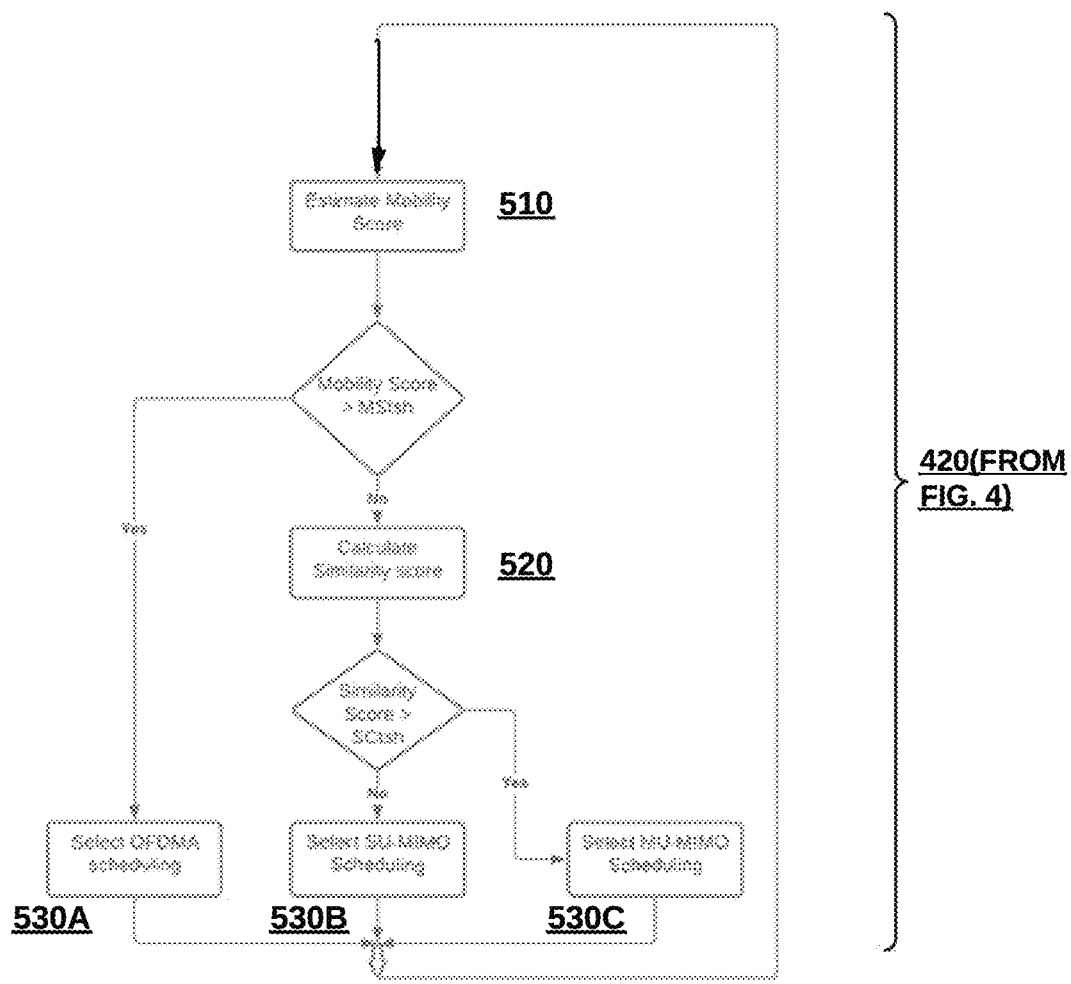
FIG. 5 is a more detailed flow diagram illustrating a method for intelligent selection of transmission type for IEEE 802.11ax Wi-Fi compliant networks based on station characteristics, according to one preferred embodiment.

FIG. 4 is a high-level flow diagram illustrating a method for intelligent selection of transmission type for IEEE 802.11ax Wi-Fi compliant networks based on station characteristics, according to one embodiment. The method 500 can be implemented, for example, by the system 100 of FIG. 1. The steps are merely representative groupings of functionality, as there can be more or fewer steps, and the steps can be performed in different orders. Many other variations of the method 500 are possible.

At step 410, a specific station or group of stations are selected for configuration with a physical layer of an access point. The determination of transmission type can be based on mobility and similarity factors of the specific station. In other embodiments, different factors are considered. The configuration can be responsive to a new station connection, a change in network conditions (e.g., increased or decreased traffic load), a new session of packets, or due to other triggers in other implementations.

At step 420 transmission type is intelligently selected based on station characteristics. In more detail, at step 510 of FIG. 5, a mobility value of the specific stations of the group of stations is determined. A transmission type of OFDMA is selected responsive to the mobility value for the specific station meeting a mobility threshold.

At step 520, a similarity value is determined between the specific station and the group of stations below the mobility threshold, wherein the control module determines a transmission type of MU-MIMO responsive to the similarity value for the specific station meeting a similarity threshold. A transmission type of SU-MIMO is selected responsive to the specific station not meeting the similarity threshold.

At step 530, a control selects OFDMA 530A, SU-MIMO 530B or MU-MIMO 530C scheduling based on mobility and similarity.

Figure 6:
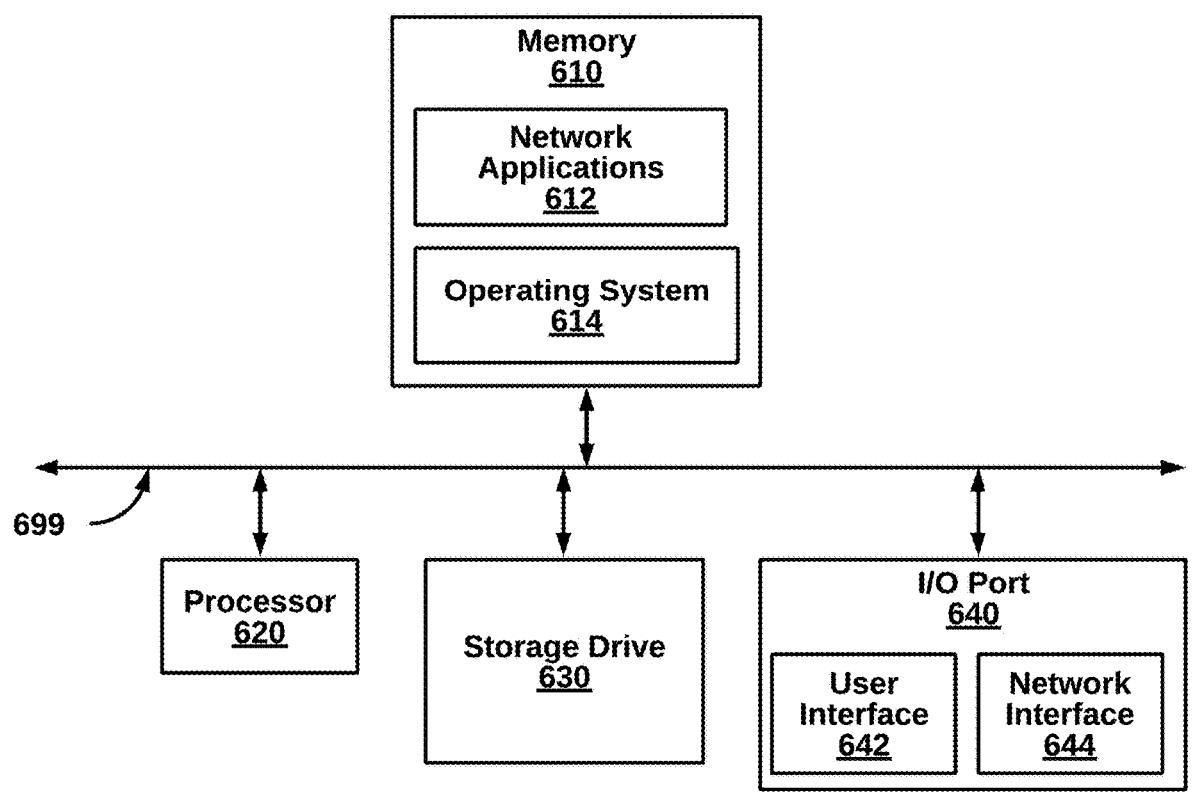
FIG. 6 is a more detailed flow diagram illustrating the step of exposing a process to an artificial virtual machine, for the method of FIG. 5, according to one embodiment.

Referring again to FIG. 4, at step 430, the network interface transmits data packets to stations using OFDMA 530A, SU-MIMO 530B or MU-MIMO 530C scheduling as selected for efficiency III. Generic Computing Environment FIG. 6 is a block diagram of a computing environment 600, according to an embodiment. The computing environment 600 includes a memory 605, a processor 622, a storage drive 630, and an I/O port 640. Each of the components is coupled for electronic communication via a bus 699. Communication can be digital and/or analog and use any suitable protocol. The computing environment 600 can be a networking device (e.g., an access point, a firewall device, a gateway, a router, or a wireless station), or a disconnected device (e.g., the access point 110 or the stations 120A-120C).

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 622 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 622 can be single core, multiple core, or include more than one processing elements. The processor 622 can be disposed on silicon or any other suitable material. The processor 622 can receive and execute instructions and data stored in the memory 222 or the storage drive 630.

The storage drive 630 can be any non-volatile type of storage such as a magnetic disc, EEPROM (electronically erasable programmable read-only memory), Flash, or the like. The storage drive 230 stores code and data for applications.

The I/O port 640 further comprises a user interface 242 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. An access point for intelligent selection of transmission type for IEEE 802.11ax Wi-Fi compliant networks based on station characteristics, the access point comprising:
 a processor;
 a network interface; and
 a memory, communicatively coupled to the processor and storing:
  a control module to select a transmission type for a specific station on a Wi-Fi network;
  a mobility detection unit to determine a mobility value of stations of the group of stations, wherein the control module selects a transmission type of OFDMA (orthogonal frequency division multiple access) responsive to the mobility value for the specific station meeting a mobility threshold; and
  a similarity detection unit to determine a similarity value between the specific station and the group of stations below the mobility threshold, wherein the control module selects a transmission type of MU-MIMO (multi-user multiple input multiple output) responsive to the similarity value for the specific station meeting a similarity threshold, and
  wherein the control module selects a transmission type of SU-MIMO (single-user multiple input multiple output) responsive to the specific station not meeting the similarity threshold,
 wherein the network interface transmits with a transceiver data packets to stations using OFDMA, SU-MIMO or MU-MIMO as selected by the control module.

2. The access point of claim 1, wherein the mobility detection unit uses RSSI (received signal strength indicator) values for the group of stations to generate mobility data used to determine the mobility value.

3. The access point of claim 1, wherein the similarity detection unit uses at least one of device type, user type, spatial coordinates, and bandwidth capabilities, to generate similarity data used to determine the similarity value.

4. The access point of claim 1, wherein the control module operates in a transmission selection mode responsive to network conditions exceeding a load threshold, and operates out of the transmission selection mode responsive to network conditions not exceeding the load threshold.

5. The access point of claim 1, wherein a load threshold comprises one or more of network congestion, queue usage, processor usage, and transmissions delays.

6. A method in an access point for intelligent selection of transmission type for IEEE 802.11ax Wi-Fi compliant networks based on station characteristics, the method comprising the steps of:
 selecting a transmission type for a specific station on a Wi-Fi network;
 determining a mobility value of stations of the group of stations, wherein the control module determines a transmission type of OFDMA responsive to the mobility value for the specific station meeting a mobility threshold;
 determining a similarity value between the specific station and the group of stations below the mobility threshold, wherein the control module determines a transmission type of MU-MIMO (multi-user multiple input multiple output) responsive to the similarity value for the specific station meeting a similarity threshold;
 determining a transmission type of SU-MIMO (single-user multiple input multiple output) responsive to the specific station not meeting the similarity threshold; and transmitting data packets to stations using OFDMA, SU-MIMO or MU-MIMO as selected by the control module.

7. The method of claim 6, wherein the mobility detection unit uses RSSI (received signal strength indicator) values for the group of stations to generate mobility data used to determine the mobility value.

8. The method of claim 6, wherein the similarity detection unit uses at least one of device type, user type, spatial coordinates, and bandwidth capabilities, to generate similarity data used to determine the similarity value.

9. The method of claim 6, wherein the control module operates in a transmission selection mode responsive to network conditions exceeding a load threshold, and operates out of the transmission selection mode responsive to network conditions not exceeding the load threshold.

10. The method of claim 6, wherein a load threshold comprises one or more of network congestion, queue usage, processor usage, and transmissions delays.

11. A non-transitory computer-readable media in an access point, implemented at least partially in hardware for, when executed by a processor, for intelligent selection of transmission type for IEEE 802.11ax Wi-Fi compliant networks based on station characteristics, the method comprising the steps of:

selecting a transmission type for a specific station on a Wi-Fi network;

determining a mobility value of stations of the group of stations, wherein the control module determines a transmission type of OFDMA responsive to the mobility value for the specific station meeting a mobility threshold;

determining a similarity value between the specific station and the group of stations below the mobility threshold, wherein the control module determines a transmission type of MU-MIMO (multi-user multiple input multiple output) responsive to the similarity value for the specific station meeting a similarity threshold;

determining a transmission type of SU-MIMO (single-user multiple input multiple output) responsive to the specific station not meeting the similarity threshold; and transmitting data packets to stations using OFDMA, SU-MIMO or MU-MIMO as selected by the control module.

12. The method of claim 11, wherein the mobility detection unit uses RSSI (received signal strength indicator) values for the group of stations to generate mobility data used to determine the mobility value.

13. The method of claim 11, wherein the similarity detection unit uses at least one of device type, user type, spatial coordinates, and bandwidth capabilities, to generate similarity data used to determine the similarity value.

14. The method of claim 11, wherein the control module operates in a transmission selection mode responsive to network conditions exceeding a load threshold, and operates out of the transmission selection mode responsive to network conditions not exceeding the load threshold.

15. The method of claim 11, wherein a load threshold comprises one or more of network congestion, queue usage, processor usage, and transmissions delays.

* * * * *